United States Patent [19]

Nishino et al.

[11] 4,061,785
[45] Dec. 6, 1977

[54] METHOD AND DEVICE FOR PRESERVING VEGETABLES

[76] Inventors: Tetsuya Nishino, 8643, Ikuta, Kawasaki, Kanagawa; Shigeyuki Yasuda, 3-25-18 Setagaya, Setagaya, Tokyo, both of Japan

[21] Appl. No.: 624,129

[22] Filed: Oct. 17, 1975
(Under 37 CFR 1.47)

Related U.S. Application Data

[63] Continuation of Ser. No. 310,979, Nov. 30, 1972, abandoned, which is a continuation-in-part of Ser. No. 30,865, April 22, 1970, abandoned.

[30] Foreign Application Priority Data

Apr. 26, 1969 Japan .................. 44-322450
Nov. 1, 1969 Japan .................. 44-103431[U]
Nov. 1, 1969 Japan .................. 44-103432[U]

[51] Int. Cl.² ........................... B65B 61/22
[52] U.S. Cl. .............................. 426/124; 206/204; 206/205; 426/106; 426/331; 426/333; 426/396; 426/398; 426/419
[58] Field of Search ............ 426/106, 118, 119, 124, 426/133, 418, 419, 323, 324, 326, 331, 333, 335, 395, 396, 398, 410, 442; 206/204, 205

[56] References Cited

U.S. PATENT DOCUMENTS

| 1,481,971 | 1/1924 | Whiting | 206/46 PV |
| 1,482,626 | 2/1924 | Whiting | 206/46 PV |
| 1,601,625 | 9/1926 | Hruby | 206/205 |
| 1,657,272 | 1/1928 | Neusbaum | 206/205 |
| 1,828,179 | 10/1931 | Gallagher | 426/124 |
| 1,909,013 | 5/1933 | Ruzicka | 426/106 |
| 2,413,129 | 12/1946 | Wilson | 426/119 |
| 2,929,761 | 3/1960 | Stevens | 426/106 |
| 3,017,304 | 1/1962 | Burgeni | 264/112 |
| 3,026,209 | 3/1962 | Niblack et al. | 426/124 |
| 3,155,303 | 11/1964 | Fenkel | 229/2.5 |
| 3,172,593 | 3/1965 | Potter | 229/3.5 |
| 3,409,444 | 11/1968 | Gentry | 426/124 |
| 3,415,662 | 12/1968 | Koger et al. | 426/106 |
| 3,450,542 | 6/1969 | Badran | 426/106 |
| 3,515,331 | 6/1970 | Guthrie | 206/46 F |
| 3,559,562 | 2/1971 | Carlson | 426/106 |

Primary Examiner—Steven L. Weinstein
Attorney, Agent, or Firm—Browdy and Neimark

[57] ABSTRACT

This invention relates to the method and device of preserving vegetables in fresh condition for a long period of time using highly absorbent material such as processed pulp cotton which is capable of preventing the formation of dew from water emitted by the vegetables and an amount of preservative sufficient to prevent the propagation of primary bacteria within the container, preferably with preservative and means to separate the vegetables from the absorbent material.

17 Claims, 14 Drawing Figures

METHOD AND DEVICE FOR PRESERVING VEGETABLES

This application is a continuation of application Ser. No. 310,979 filed Nov. 30, 1972, now abandoned, which in turn was a continuation-in-part of Ser. No. 30,865, filed Apr. 22, 1970, now abandoned.

This invention is related to the method and the device used therein, of preserving fruits, garden produce, flowers and other vegetables (hereinafter referred to as "vegetables") in fresh condition from the time they are picked until the time they are used, including storage and transportation time. Vegetables are living bodies and their living processes continue even during storage and transportation. Over a length of time, excess juice evaporates and the weight of the vegetables decreases. Further, the vegetables become subject to the invasion of bacteria and decay and to complicated chemical physiological changes. Therefore, great efforts have been made in the trade to prevent these phenomena and to preserve the freshness and quality of vegetables during prolonged storage and transportation.

Heretofore, the methods of preservation conventionally adopted have been: (1) the method of preservation at low temperature; (2) the method of storage in artificially controlled atmosphere (the so-called "controlled atmosphere"); (3) the method of using preservatives chemicals; (4) the method of using radioactive rays, etc. From among these, method (2) and a combination of methods (2) & (3) have been used comparatively often. These methods are the most suitable over other methods of preservation, since the wrapping and sealing in plastic film and other coverages prevents the penetration of secondary bacteria and moisture from the outside air. However, certain defects are unavoidable. For instance, since in these methods the vegetables are almost completely separated from the outside atmosphere, even if low temperature is used to preserve the vegetables, the moisture which is emitted from them causes the temperature to increase, which results, especially in vegetables which are adversely affected by even small amounts of moisture, in the immediate increase in respiration, expansion of the skin, and rapid propagation of green mold. Especially regarding such vegetables as spinach, which have large respiration, the respiration causes the temperature inside the film to rise rapidly, which hastens the decay.

An object of this invention is to make available a method of preserving vegetables in fresh condition in a simple and inexpensive way and for a long period, while ameliorating the faults of all the methods available previously hereto. Another object is to provide a device which can be produced simply and at low cost and which can be used for long term preservation of vegetables. The other objects of this invention will become apparent from the following detailed description and the accompanying drawings wherein.

Figure 1:
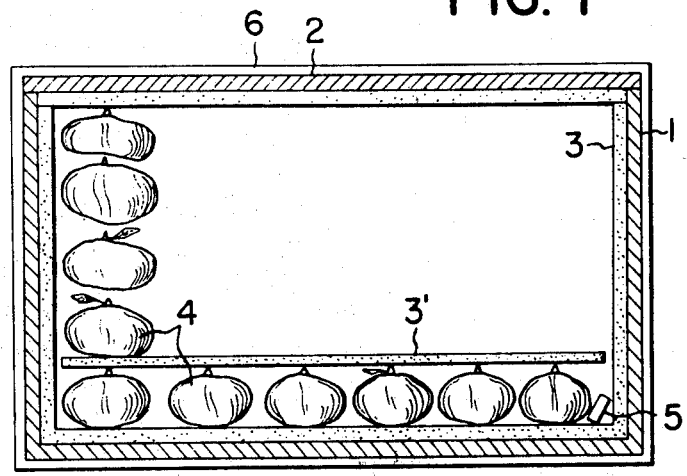
FIG. 1 is a cross-sectional view of the container used in an embodiment of the invention.

To outline this invention, it consists of a method and a device for preserving vegetables for a long period of time by (1) positioning properly highly hygroscopic material such as "processed pulp", as explained below, within the container which is used to hold the vegetables, (2) preferably separating the vegetables from such absorbent material by means of separators with open cavities of appropriate sizes, (3) preferably placing into the container, together with the vegetables, antiseptic chemicals or preservatives in such an amount as is sufficient for the control of primary bacteria, and (4) wrapping and sealing the opening of the container in plastic film or sheet or some other equivalent material, or sealing the opening of the container composed of plastic film, sheet and the like.

The application of this invention makes it possible to preserve vegetables without deterioration of quality for periods much longer than the conventional preservation methods. Such an effect is obtained by (1) the sealing of the opening of the container which reduces the amount of respiration of the vegetables inside the container, and therefore, the accumulation of moisture emitted from the vegetables, (2) the use of the highly absorbent material, which almost entirely prevents the formation of water drops and deterioration from moisture (mold propagation, decay, etc.), and (3) the use of preservatives which effectively control primary bacteria within the container, mainly in the absorbent material, thus enabling the vegetables to be kept in the environment most suitable for their preservation.

The container in the invention may be a conventional cardboard, wooden, or plastic box. It may also be a bag composed of plastic film or sheet. When plastic film or sheet is used for the container, it is preferable that the thickness of the plastic used is in the range of 0.01~0.1 mm to obtain optimum gas permeability. The absorbent material which is positioned in the container must have the ability to absorb the moisture emitted by the vegetables quickly and so prevent the formation of water drops within the sealed container. It has been discovered by the inventors that "processed pulp" is the best hygroscopic material for the purpose. It should be understood that the terms "processed pulp", "unprocessed pulp", and "processed" or "unprocessed pulp cotton" have a special meaning when used in the context of the present specification and claims. The "pulp cotton" or "unprocessed pulp" of the present invention is described in Japanese patent publication No. 41-9801 published on May 26, 1966 to the Kokusaku Pulp Industry Co., Ltd. The part of an English translation of the above-mentioned Japanese patent which describes "pulp cotton" is hereby incorporated:

"This invention relates to a method of manufacture of pulp cotton.

"Present day materials which are called pulp cotton or pulp powder (hereinafter called pulp cotton) are made from wood by means of smashing and disaggregating, and there are now coming to be used as substitutes for expensive cotton made from seed cotton. Since pulp cotton uses wood as its raw material, the length of fiber of the pulp is similar to or less than that of the fiber of lumber (in case of the wood of a coniferous tree, the length is 2 or 3 mm.).

"It is unavoidable that the fields in which pulp cotton can be utilized are limited when compared to seed cotton, because the fiber of the pulp cotton is shorter than that of the seed cotton.

"On the other hand, in some fields pulp cotton must be utilized. Also, it is useful when the intertwining and strength characteristics of the fiber of seed cotton are not necessary. For example, it is thought that pulp cotton is rather better for use as a sanitary cotton than ordinary cotton, for it dissolves in water. Sanitary pulp cotton is to be manufactured for sale in the future.

"At present, however, we are unable to obtain pulp cotton having uniformity and good quality, since it is produced from a raw material which is too fine and so conglomerates in places.

"There is a little published literature regarding the manufacture of pulp cotton, but in general it is thought that if anyone wishes to make pulp cotton, he must disaggregate the pulp sheet to each individual fiber of wood. In practice, when one tries to disaggregate by this method with a machine, he will realize that it is unexpectedly difficult to smash the pulp sheet regardless of what kind of machine is used. It requires great power to disaggregate pulp sheet and this tends to cause the fiber to become shorter than usual, since the fibers have heavy coherence between them, and will be cut off with disaggregation.

"Also, it is not rare for many un-disaggregated combined fibers to remain in the produced pulp cotton. The inventor of this patent considered the combination of fibrin and a fiber, and realized that it is almost impossible to disaggregate without cutting the fiber short, by the usual methods of manufacturing pulp cotton which involve smashing the pulp sheet with a machine, and conceived of a novel method of manufacturing the pulp cotton by a chemical process. The main points are that a cellulose substance (pulp etc.) which is in slurry or wet condition has a surface active agent (anionic or non-anionic) added to it and is dried, and then smashed."

One example appearing in the above mentioned patent is translated as follows:

"AN EXAMPLE OF EXPERIMENT"

"First, using a coniferous tree, a bleaching sulfite pulp is dipped in 20 l. of water and made into a pulp slurry of concentration 1.5%, to which is added 400 cc of 5% of sodium oleic acid (anionic surface active agent solution), and is then dried for 2 to 3 hours in air of 105° C in a circulative box-type air dryer.

"The pulp cotton of this invention is made from disaggregation with dried pulp by rotating impact grinder and the produced cotton does not contain any conglomerated fibers and fibers do not change their lengths compared with before disaggregation.

"In the process of production of pulp cotton, when we try the same process as the said method, that is water slurry change, filtration, and drying, omitting only the surface active agent process, and disaggregate the pulp sheet by the rotating impact grinder, and/or when the pulp sheet (a bleaching sulfite pulp of a coniferous tree) which has not had any treatment, is disaggregated, the cotton contains many unified fibers which are relatively short compared with before disaggregation."

Unprocessed pulp cotton does not serve well the purpose of the present invention since it is a mass of short fibers loosely attached to each other, having low form retentiveness, and if external pressure is applied or there is an increase in the moisture content, it readily falls to pieces, thus offering problems in handling.

"Processed pulp" solves these problems. "Processed pulp" may be either pulp sheet or processed pulp cotton. "Processed pulp cotton", as used throughout this specification and claims, is an aggregation of pulp cotton, such aggregation being caused by the application of small amounts of water through spraying or other appropriate means, followed by the application of light pressure. The "pulp cotton" fibers are first piled up into a thick sheet form by any appropriate means, and then the formed sheet is sprayed with water and roll pressed, preferably to such an extent that the interior portion of the sheet still maintains low consistency, which is desirable because the sheet more easily retains water as absorbed. Due to a high degree of cohesion among fibers, processed pulp cotton does not collapse easily as does unprocessed pulp cotton, thus enabling easy handling. Processed pulp has substantially superior hygroscopicity to that of unprocessed pulp.

A method for the preparation of the processed pulp cotton will now be explained in further detail. The pulp cotton in the sense of Japanese patent publication No. 41-9801 is placed on a flat board so as to form a flat layer of an even thickness. The thickness may vary widely depending upon the kind of vegetables to be preserved. Water is then sprayed onto the upper surface of the flat layer of the pulp cotton. The amount of water may vary from 10 to 300 g per square meter. Subsequent to the spray of water, pressure is applied to the pulp cotton, which may vary from 0.5 to 20 kg/cm$^2$ (approximately 7–280 psig). Upon application of pressure, a hardened layer of a thin thickness is formed in the upper surface portion of the pulp cotton. The thickness of the hardened layer depends upon the amount of water sprayed and the pressure applied. The hardened layer of the pulp cotton resembles the crust portion of bread. The hardened state remains unchanged by lapse of time. The remaining portion of the pulp cotton maintains the state it was in before the application of pressure.

The pulp cotton processed as above indicates an excellent feature of hygroscopicity. The hardened layer disperses water very quickly in the direction parallel to its surface and when this layer is saturated with water, water is then transferred to the remaining portion of the pulp cotton, which portion has an ability to retain water. Liquid water formed within the pulp cotton does not freely permeate the hardened layer so as to contact the objects for preservation.

The pulp cotton may be processed from both surfaces thereof. Upon processing of the pulp cotton as mentioned above, the pulp cotton may be reversed and it may be processed again in the same manner, thereby forming a hardened layer on the other surface of the pulp cotton. The two hardened layers may be formed in one step by passing the pulp cotton through a device equipped with water sprays and press rolls on both sides of the pulp cotton.

The quantity of processed pulp to be used inside the container should generally be sufficient to absorb the moisture which accumulates during the period of preservation within the container, preventing the formation of water drops therein. We can substitute for the processed pulp in the invention, any hygroscopically suitable material that is commercially available but material that cannot retain the absorbed water should not be used because the water seeping from the material causes deterioration of the vegetables. The absorbent material may be attached to the inner wall of the container as lining or simply inserted.

For the preservatives in the invention, any of the conventional preservative materials may be used. The most suitable preservatives are benzoic acid, sodium benzoate and sorbic acid, etc. They may be dissolved in water or alcohol and applied in very small amounts to the absorbent material or placed in a small bag and inserted in the container. Inside the sealed container the preservatives easily evaporate and occupy the space within the container in the form of gas. The amount necessary is much smaller than if conventional methods are employed, and is even substantially smaller than in the case where preservatives are used in combination with the controlled atmosphere method. This is because the preservative in this invention is required merely to control primary bacteria whose activity is substantially reduced by the lack of water within the container as a result of absorption by the processed pulp. Since the absorbent material absorbs the moisture within the container, it is likely to become so wet as to allow the propagation of primary bacteria or mold either on the surface or the inside of the absorbent material itself. Thus the main purpose of the use of preservative in most occasions is to suppress the propagation of mold in the absorbent material.

The most effective means to isolate the contents of the container from the open air is the wrapping and sealing of the container in plastic film or sheet. The purpose of isolation from the open air is both to prevent outside moisture and secondary bacteria from entering and to limit the amount of oxygen in the container, thus reducing the respiration of the vegetables and, therefore, the accumulation of moisture emitted by respiration. From the point of easy obtainability, polyethylene and vinyl films are the most suitable plastic films. Preferably the thickness of the plastic used is in the range of 0.01~0.1 mm to obtain optimum gas permeability. These have some gas permeability but do not allow the passage of moisture or bacteria from the outside air.

The container with the vegetables inserted in accordance with the invention may be kept in a natural environment, such as in a kitchen of regular temperature and moisture. No artificial reduction in temperature or moisture is necessary. Further, if the container is stored at a low temperature, e.g., in an icebox, the activity of the primary bacteria further declines and good preservation can be expected, but it should be noted that other problems, such as low temperature deterioration, are likely to arise.

In this invention, the processed pulp employed as absorbent material also acts as a buffer and in this way further contributes to the long preservation of the vegetables. When physical damage is sustained as the result of blows or collisions, the vegetables develop calluses, metabolism increases, the enzymes are activated and degeneration is accelerated. The soft processed pulp as the lining of the container, however, absorbs any direct blow, or at least, reduces its intensity, thus preventing physical damage, and consequently, deterioration.

As mentioned above, the absorbent material of the invention is excellent for the preservation of vegetables, but if the vegetable makes sufficient direct contact with the absorbent material, it is easy for the vegetable to sustain deterioration at the point of contact. Therefore, it is desirable to provide some suitable means of separating the vegetables and the absorbent material. The means for separation used in this invention provide the cheapest and most easily produced means. One of the means is to employ a container made of plastic film or sheet with indentations at regular intervals and to fill the resulting cavities or recesses in the inner surfaces of the wall of the container with highly absorbent material such as processed pulp cotton. The other means is to use separators to separate the vegetables from the inner surfaces of the absorbent material which is used to line the container or is laid between the layers of the vegetables. The separators are sheets of appropriate thicknesses with holes or cavities of appropriate sizes. The separators are preferably made of soft plastic sheet with cut-out holes, soft plastic strips interwoven with large meshes, or soft plastic sponge with open cells.

Referring to the drawings, in FIG. 1, the container 1 is a box made of cardboard, paperboard, wood, etc., into which, when the lid 2 is opened, the vegetables to be preserved are inserted. On the inner walls of the box 1, the processed pulp 3 is attached. The vegetables 4 are placed in the box 1. If necessary, the processed pulp 3' may be placed between individual vegetables. The preservative may be applied in small quantities to the processed pulp, but in the embodiment in FIG. 1 a small bag 5 contains absorbent cotton soaked with the preservative. After placing the lid 2 into position, the box is wrapped and sealed on all sides in plastic film 6.

Figure 2:
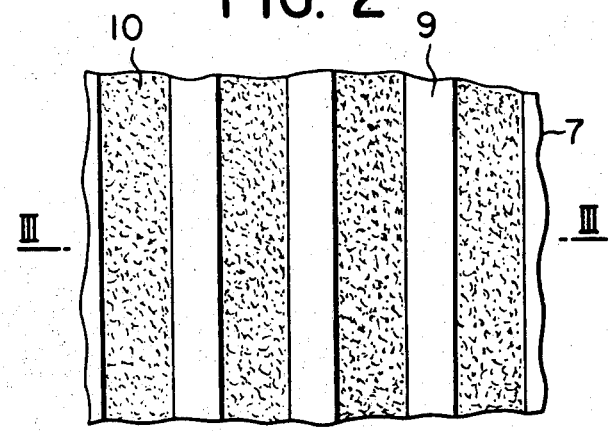
FIG. 2 is a partial plan view of another embodiment of the invention.
Figure 3:
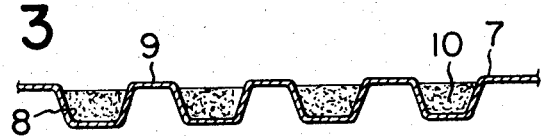
FIG. 3 is a cross-sectional view taken on the line III—III of FIG. 2.
Figure 4:
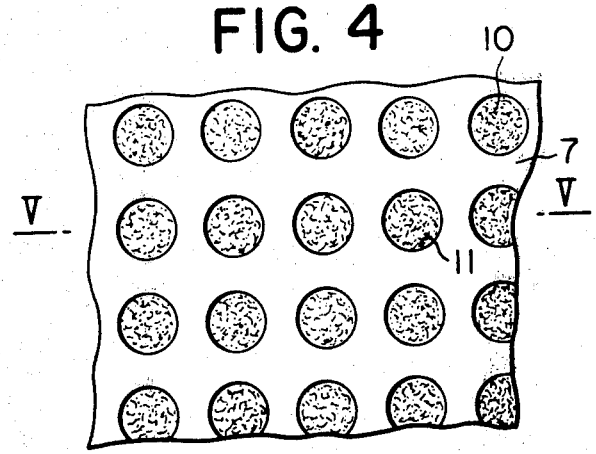
FIG. 4 is a partial plan view of still another embodiment of the invention.
Figure 5:
FIG. 5 is a cross-sectional view taken on the line V—V of FIG. 4.

FIGS. 2 to 14 are related to the materials used for preservation in the invention. In FIGS. 2 and 3, plastic film or sheet 7 is corrugated in cross section, with grooves 8 at regular intervals. In each groove 8, the absorbent material 10 of processed pulp, etc., is laid preferably to a level slightly lower than the top surfaces of the elevations 9 as indicated in FIG. 3, and thus direct contact with the vegetables is avoided. In FIGS. 4 and 5, the plastic film or sheet 7 is made with circular recesses 11 at regular intervals, and the absorbent material is filled in these recesses 11. It is preferable that the absorbent material be filled only to a level slightly lower than that of the plane surface of the film or sheet 7 as indicated in FIG. 5.

Figure 6:
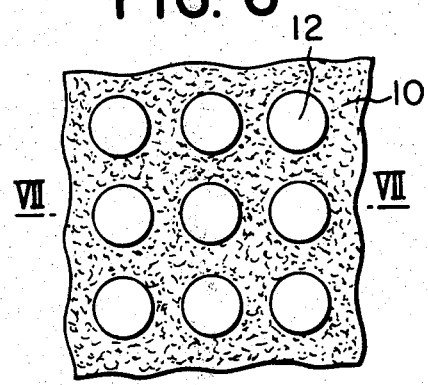
FIG. 6 is a partial plan view of a further embodiment of the invention.
Figure 7:
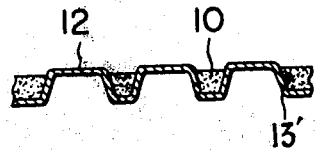
FIG. 7 is a cross-sectional view taken on the line VII—VII of FIG. 6.

FIGS. 6 and 7 show the plastic film or sheet 7 provided with circular projections 12, and the absorbent material 10 is filled into the surrounding area 13' of the projections 12. As shown in FIG. 7, it is preferable to have the absorbent material filled to a level slightly lower than that of the plane surface of the projections 12.

Figure 8:
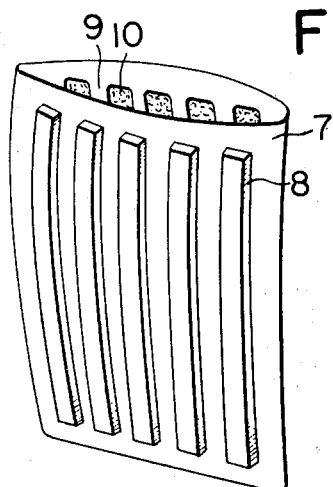
FIG. 8 is a perspective view of a bag made from the material of FIG. 2.
Figure 9:
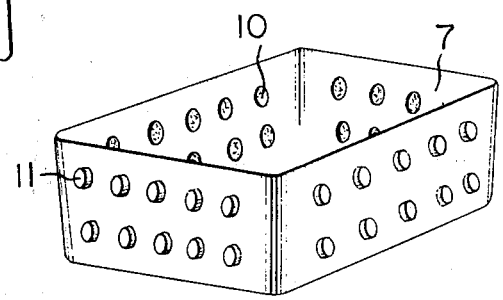
FIG. 9 is a perspective view of a box made from the material of FIG. 4.

FIG. 8 shows the material of FIGS. 2 and 3 formed into a bag with elevations 9 on the inside of two films or sheets which are joined at the two side edges and bottom. The vegetables are introduced through the top opening which is then sealed. FIG. 9 shows the material of FIGS. 4 and 5 formed into a box shape container. Vegetables are placed into the box and the top is sealed by the same or other appropriate material.

Figure 10:
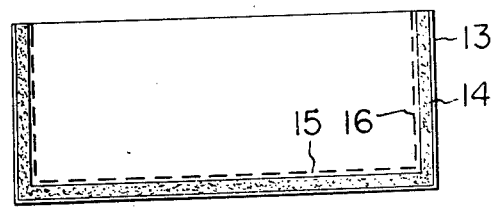
FIG. 10 is a sketch showing the outline of a still further embodiment of the invention.

In FIG. 10, the outer walls 13 are made of plastic film, sheet or other material. It is sealed, after the vegetables have been inserted, to prevent the entry of moisture and secondary bacteria from outside. The absorbent material 14 is made from processed pulp, etc. and is used as the lining of the outer walls 13. The separators 16 are sheets of appropriate thicknesses and are positioned adjacent to the inner surfaces of the absorbent material 14. The separators 16 are provided with holes 15 utilized to allow the moisture to pass. The separators 16 prevent the direct contact of the vegetables with the absorbent material. It is desirable that the separators 16 be of comparatively soft plastic. They may, in particular, be of soft plastic sponge with open cells. In the latter, the cells act as holes 15 for the passage of moisture. Rubber may be substituted for plastic. The size, form and number per area of the holes 15 including the cells may vary in accordance with the variety of vegetables to be preserved.

Figure 11:
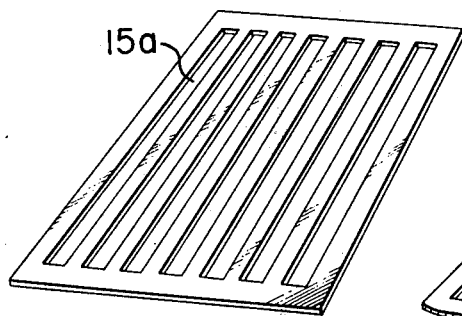
FIG. 11 is a perspective view of a separator used in the embodiment of FIG. 10.
Figure 12:
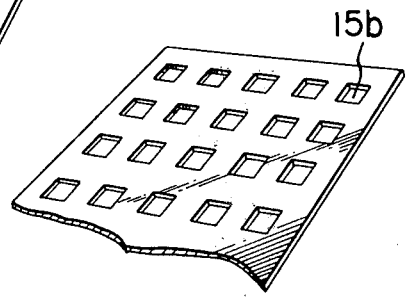
FIG. 12 is a perspective view of another separator.
Figure 13:
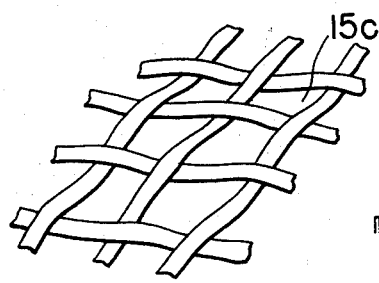
FIG. 13 is a perspective view of still another separator.
Figure 14:
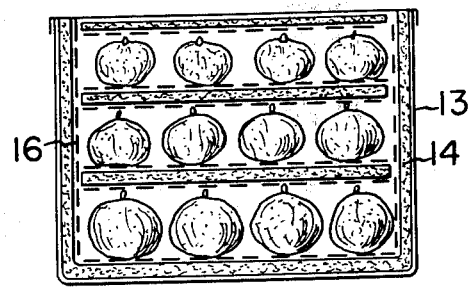
FIG. 14 is a sketch showing the vegetables to which the embodiment of FIG. 10 is applied.

FIG. 11 shows a sheet of separator with long groove-shaped holes 15a, made at appropriate intervals. FIG. 12 shows another example of a separator, having holes 15b in a grid-shaped pattern. FIG. 13 shows a separator having the holes 15c left between strips woven with large meshes. Though the separators 16 are generally placed along the inner walls of the absorbent material 14, they may be placed between each layer of the vegetables in case the latter are laid in multi-layers as shown in FIG. 14.

The invention will be further illustrated by the following experiments.

EXPERIMENT 1

An experiment was conducted on cucumbers which were equal in form, weight (approximately 60 gr each), period since harvesting and external appearance and which had been kept under equivalent conditions since harvesting. Three of them were placed respectively into each of four separate ordinary cardboard boxes of 1.5 l. capacity at normal temperature and humidity. The tops of the containers were not covered so that the inside of the containers remained visible.

No. 1 container was open to the air, and neither absorbent material nor preservative was used. No. 2 container was sealed in polyethylene film of 0.04 mm in thickness after the cucumbers were inserted. No. 3 container was exactly the same as No. 2 container except that it contained, as preservative, 20 mg of sodium benzoate dissolved in 40 mg water. The preservative was applied to the cucumbers in the conventional way. No. 4 container was processed according to the present invention. The processed pulp sheet of 1 mm thickness, was used to line a cardboard box of the same type, the lining being attached to all the inside walls of the box except the top. Sodium benzoate in the amount of 20 mg dissolved in 40 mg water was applied to absorbent cotton and put into a small polyethylene bag. The opening of the bag was kept open so as to allow the preservative to evaporate and fill the interior of the container. A test established that only 0.2~0.3 mg sodium benzoate evaporated. Cucumbers were placed into the container which was wrapped in the same kind of polyethylene film as was used in No. 2. The experiment was continued for 15 days.

The cucumbers in No. 1 container began to soften and droop on the second day. In No. 2 and No. 3, none appeared to soften or droop during the experiment period, but on the second day water drops began to form over a wide area on the inside wall of the containers and after the 8th day decay began to appear at some places on the cucumbers. In No. 4, no irregularities occurred even on the 15th day, and the cucumbers maintained the same freshness they had had when they were inserted.

EXPERIMENT 2

Four lots of spinach, of 200 gr each and of the same external appearance, which had been harvested at the same time, and which had been kept under equivalent conditions since harvesting, were placed respectively into containers of the same construction as those in Experiment 1 and the same preservation methods were used. The experiment was conducted for 10 days at normal temperature and moisture. In No. 1 container, drooping began on the second day and the product became inedible. In No. 2 and No. 3, the spinach did not droop during the experiment period, but after the second day water drops formed over a wide area on the inside wall of the container and from the 6th day decay began to form from the bottom part of the spinach. In No. 4 container, no irregularities occurred even on the 10th day and the spinach maintained its initial freshness.

EXPERIMENT 3

Into the same types of container as in Experiment 1 (but with each container of 2 l. capacity), Satsuma oranges (citrus unshu) in similar condition were placed, 10 pieces in each container, and the experiment conducted over one month period at normal temperature and moisture. In No. 1 container, softening and drooping began from the 4th day. On the 9th day decay was visible in two oranges, and on the 11th day decay was visible in all oranges. In No. 2, decay began from the 14th day. In No. 3, decay began from the 21st day, and decay was visible on all oranges on the 23rd day. In No. 4 container, no irregularities occurred and even after 1 month the oranges were still in fresh condition.

EXPERIMENT 4

The same types of container as in Experiment 1 were used, except that the capacity was 1.5 l. each. Strawberries in similar condition were placed into the containers. Each container contained approximately 500 gr of strawberries. The experiment was conducted for a week at normal temperature and moisture. In No. 1 container, the strawberries turned black in color on the second day. Green mold appeared on the third day, and covered the entire surfaces of the strawberries on the fourth day. In No. 2 and No. 3, the color turned slightly black on the fourth day and there was a small amount of mold on the fifth day. The mold later increased and was visible in all strawberries on the sixth day. In No. 4 container, there was no deterioration in appearance of in freshness even when the experiment period was over.

EXPERIMENT 5

Pulp cotton was placed on a flat surface to form a flat layer of an even thickness of 10 mm. Water was sprayed onto the surface of the layer at the rate of 86.4 g per square meter. Subsequently, a pressure of 3 kg/cm$^2$ was applied by means of a roll press.

As the result, a hardened layer of a thickness of 0.7 mm was formed in the upper surface portion of the pulp cotton. The total thickness of the pulp cotton as processed was 6 mm.

The pulp cotton as processed above was then reversed, and the other surface was also processed in the same manner. A hardened layer of a thickness of 0.7 mm was also formed on the other surface. The total thickness of the pulp cotton was reduced to 4 mm.

What is claimed is:

1. A package assembly for the preservation of vegetables to be placed therein, comprising a container with wall means, at least a layer of which consists of plastic material to be sealed after the vegetables are inserted thereinto, for isolating the inside of the container from the outside air to the extent of preventing the introduction of moisture and bacteria while permitting some air permeation, said container containing therein a highly moisture and shock absorbent material capable of preventing the formation of dew from the water emitted by the vegetables, said absorbent material being composed of processed pulp cotton, and a preservative located in the container, in an amount sufficient to prevent the propagation of primary bacteria within the container when the vegetables are present therein.

2. A package assembly according to claim 1, in which said plastic material is selected from the group consisting of polyethylene and polyvinyl chloride with a thickness in the range of 0.01 to 0.1 mm. with some gas permeability is used as said means for isolating the vegetables inside the container from the outside air.

3. A package assembly in accordance with claim 1, further including a fruit, flower or vegetable to be preserved disposed within said wall means.

4. A package assembly in accordance with claim 1, further including means for preventing contact between said absorbent material and the vegetables when the vegetables are placed in said container.

5. A package assembly according to claim 4, in which said means for preventing contact comprises separating means provided with cavities for the passage of moisture.

6. A package assembly according to claim 5, in which sponge with open cells is used as said separating means.

7. A package assembly according to claim 5, in which a sheet of soft plastic or rubber with cut-out holes is used as said separating means.

8. A package assembly according to claim 5, in which sheets of soft plastic or rubber in strip form woven so as to leave holes among them are used as said separating means.

9. A package assembly according to claim 12, in which said mens for preventing contact comprises recesses formed on the inner surface of said wall means, said absorbent material being filled therein in such a way that contact between said absorbent material and the vegetables is prevented.

10. A package assembly in accordance with claim 9 in which said plastic material is selected from the group consisting of polyethylene and polyvinyl chloride with a thickness in the range of 0.001 to 0.1 mm.

11. A package assembly in accordance with claim 9, wherein said recesses are formed on the inner surface of all sides of said wall means.

12. A package assembly in accordance with claim 9, wherein said recesses are in the form of strips.

13. A package assembly in accordance with claim 9, wherein said recesses are circular in form.

14. A package assembly in accordance with claim 9, wherein said recesses constitute at least one depression which surrounds a plurality of circular projections.

15. A package assembly in accordance with claim 9, wherein said container is substantially parallelepiped in shape and said recesses are in at least the four vertical sides of said wall means.

16. A package assembly in accordance with claim 9, wherein said container is a bag and said wall means comprise two walls joined at the two side edges and the bottom and sealed at the top after the vegetables have been placed therein, said recesses being formed on the inner surfaces of both of said walls.

17. A method for preserving fruits, flowers, garden produce and other vegetables in fresh condition, comprising:

placing the fruits, flowers, garden produce or other vegetables in a package assembly comprising a container with wall means at least a layer of which consists of plastic material for isolating the inside of the container from the outside air to the extent of preventing the introduction of moisture and bacteria while permitting some air permeation, said container containing therein a highly moisture and shock absorbent material capable of preventing the formation of dew from the water emitted by the fruits, flowers, garden produce or other vegetables, said absorbent material being composed of processed pulp cotton, and a preservative located in the container, in an amount sufficient to prevent the propagation of primary bacteria within the container when vegetables are present therein; and sealing said wall means.

* * * * *